Oct. 11, 1966 M. L. HENDRICK 3,277,777
PICTURE PROJECTING AND OVERLAY REGISTERING
AND VIEWING APPARATUS
Filed Jan. 9, 1964 3 Sheets-Sheet 1
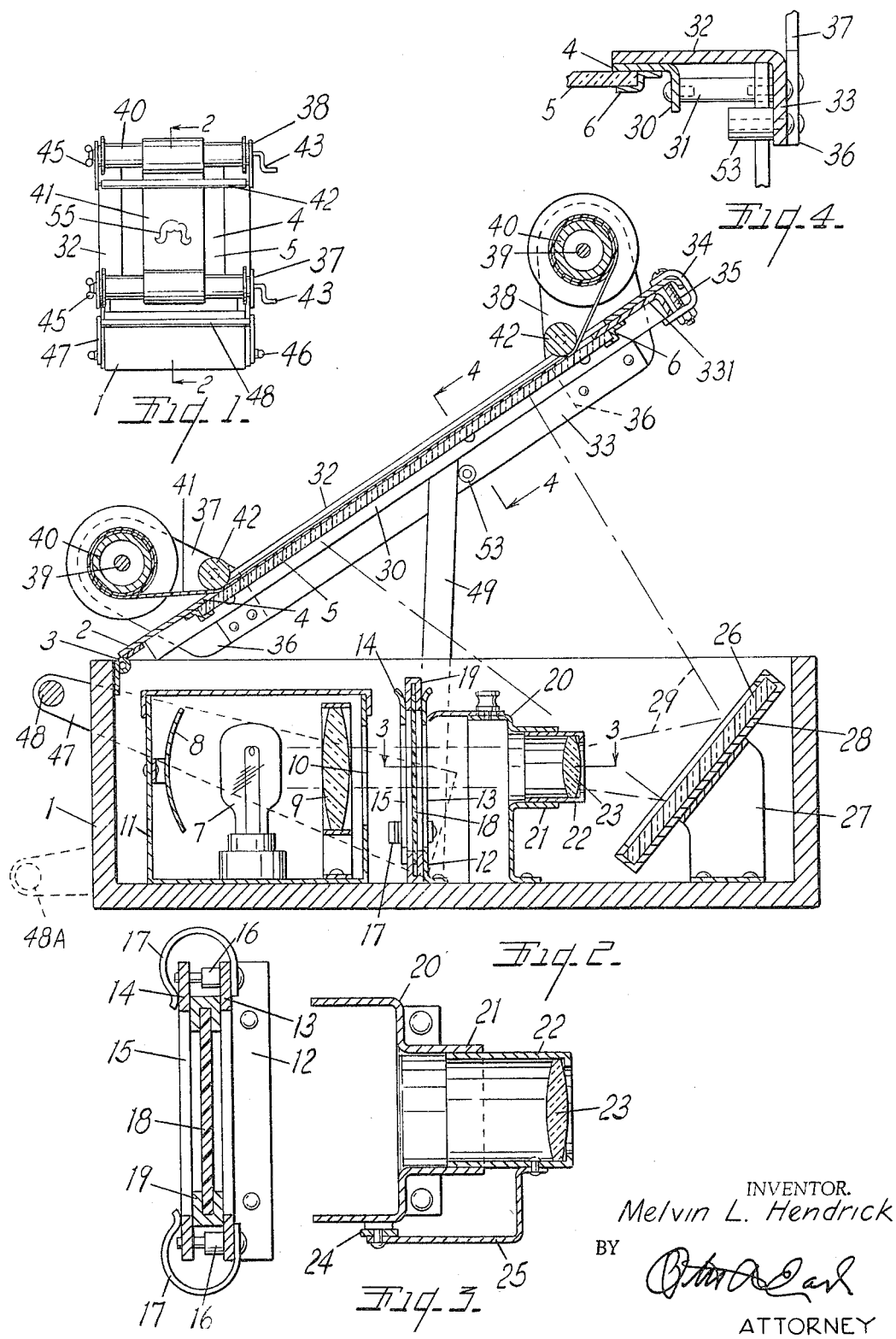
INVENTOR.
Melvin L. Hendrick
BY
ATTORNEY INVENTOR.
Melvin L Hendrick
BY
ATTORNEY.

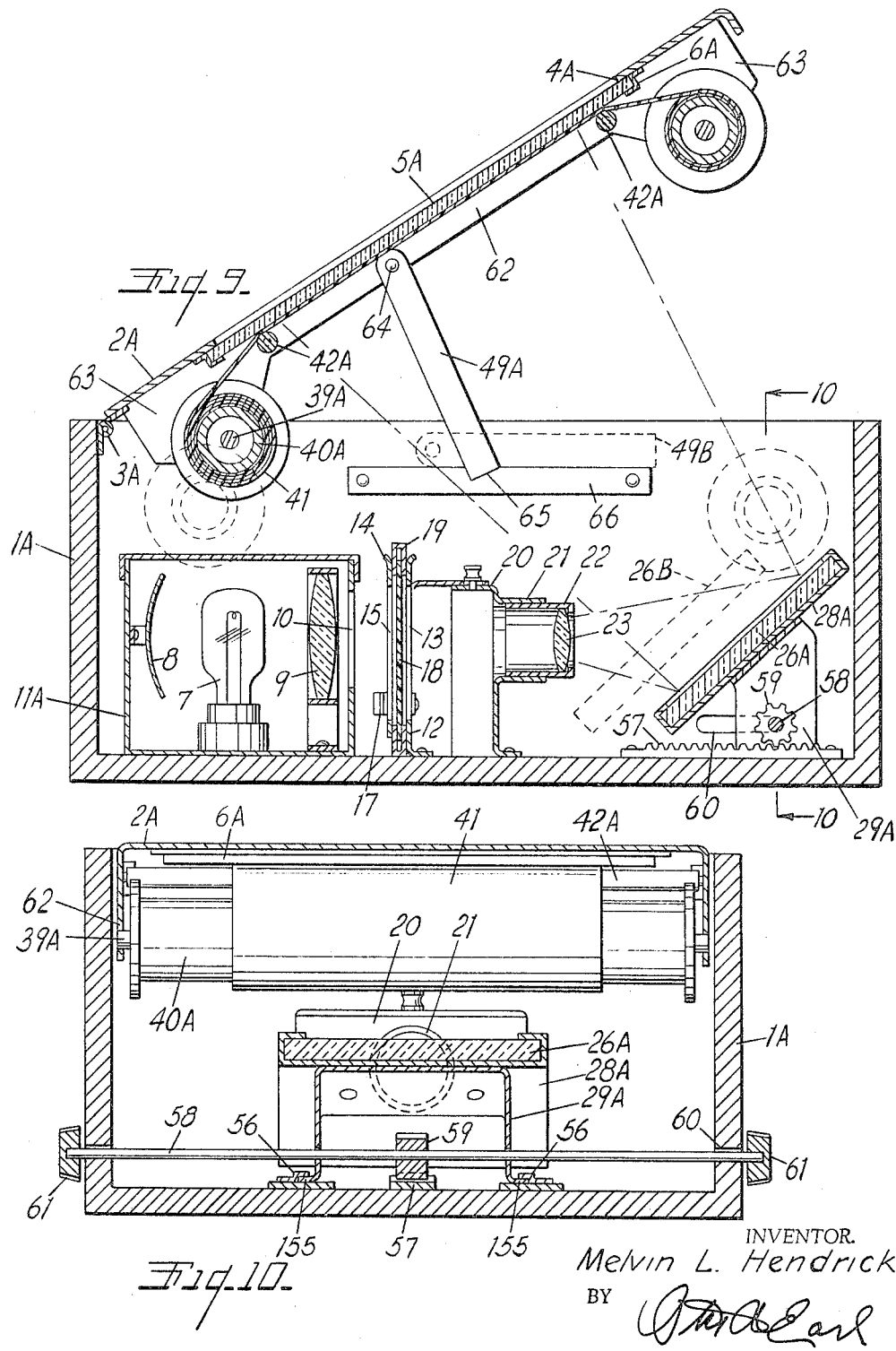

United States Patent Office 3,277,777
Patented Oct. 11, 1966

3,277,777
PICTURE PROJECTING AND OVERLAY REGISTERING AND VIEWING APPARATUS
Melvin L. Hendrick, 6080 Twilight, Kalamazoo, Mich.
Filed Jan. 9, 1964, Ser. No. 336,797
14 Claims. (Cl. 88—24)

This invention relates to improvements in picture projecting and overlay registering and viewing apparatus.

The principal objects of this invention are:

First, to provide a picture projecting apparatus by means of which a picture of a subject may be projected on a viewing screen for viewing by the subject and in which an overlay which alters the appearance of the subject may be registered with and viewed simultaneous with the picture in proper registry and size relationship.

Second, to provide an apparatus in which a newly or contemporaneously prepared photograph of a subject may be viewed simultaneously with previously prepared overlays in illuminated display on a screen so that the subject may be viewed and compared with different overlays.

Third, to provide a picture viewing apparatus in which the image projected through a transparency of the subject is projected upon a transparent screen and in which a plurality of different overlay images may be viewed successively in proper registry with the image and illuminated by the light being projected with the picture.

Fourth, to provide a picture projecting and viewing apparatus which can be economically adapted to existing viewing mechanisms to overlay different images of overlay subjects on the projected picture with a minimum expense and providing means for registering the size and position of the projected picture relatively to the overlaid image.

Fifth, to provide a projection and viewing apparatus by means of which a woman may observe her own face with various prestyled and printed hair arrangements in life-like illuminated display and in proper registry.

Other objects and advantages of the invention will be apparent from a consideration of the following description and claims. The drawings of which there are three sheets illustrate a first highly practical form of the projecting and viewing apparatus and its mode of operation and a modified form of apparatus for registering and equalizing the size of the projected picture subject to the size of an overlay image.

FIG. 1 is a front perspective view of a first form of the projecting and viewing apparatus in operative position.

FIG. 2 is an enlarged longitudinal sectional view taken along line 2—2 in FIG. 1.

FIG. 3 is a fragmentary horizontal sectional view through the subject picture holder and lens system taken along the plane of the line 3—3 in FIG. 2.

FIG. 4 is a fragmentary enlarged sectional view taken along the plane of the line 4—4 in FIG. 2, illustrating a portion of the picture image size adjusting mechanism.

FIG. 9 is a longitudinal cross sectional view through a modified form of picture image projector and viewer with a modified form of overlay picture holder associated therewith.

FIG. 10 is a fragmentary transverse cross sectional view taken along the plane of the line 10—10 in FIG. 9.

Figure 5:
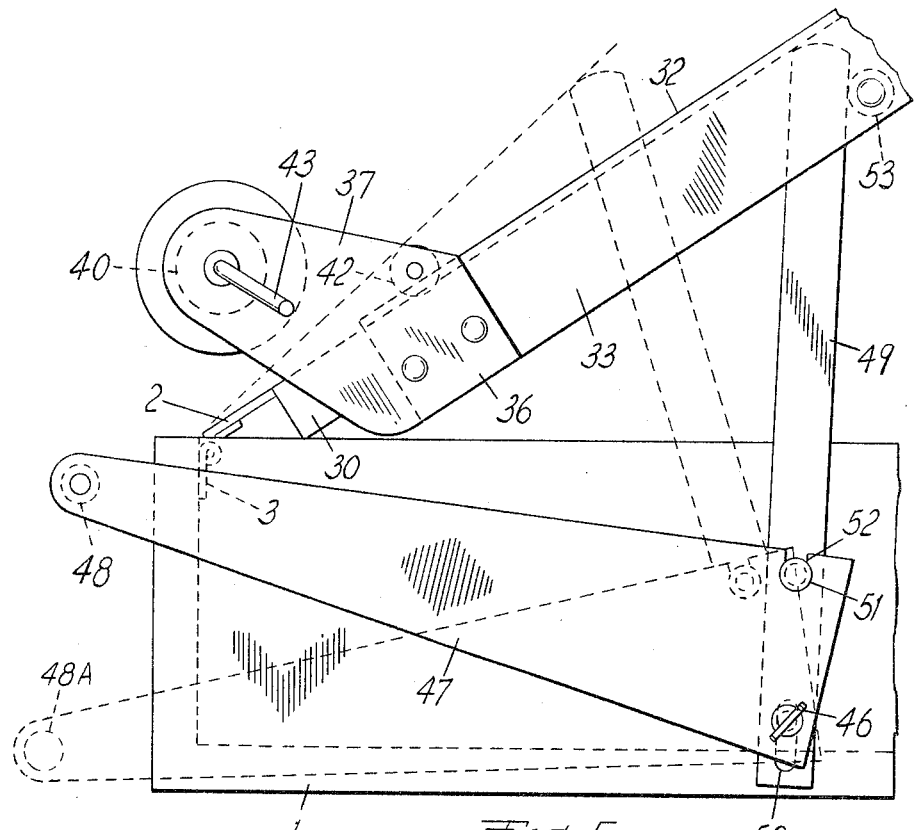
FIG. 5 is a fragmentary enlarged side elevational view of the projecting apparatus with the picture image size adjusting mechanism in operative relation thereto.

The picture image projector and overlay viewing apparatus of the invention is useful primarily by hair dressers to permit a woman to view a picture of her own face with various precreated and preprinted transparent pictures of different hair styles in order to select the hair style which the customer prefers. However, the projecting and viewing apparatus may be used in other connections for viewing a subject picture with overlays of different arrangements such as different hats or garments on a person or different landscape arrangements or interior decorations arrangements on the interior or exterior of buildings. The apparatus of the invention is operable with black and white transparencies or with color transparencies depending upon the desires of the user as will be pointed out.

The projector of the apparatus is an addition to an existing projecting and viewing mechanism provided for viewing transparent photographic slides. The mechanism consists of a case 1 having a view screen holding plate 2 hingedly connected thereto at 3 to fold into the case when not in use. The plate 2 has a central rectangular viewing aperture 4 behind which there is mounted a ground glass viewing screen 5 held in place by a border band 6 of angular cross section.

Within the case 1 is a light source consisting of a lamp 7 which is energized through suitable connections not illustrated and a reflector 8 for reflecting light from the lamp through a lens 9 and an aperture 10 in a box 11 which encloses the light source. The light is directed from the aperture 10 through a slide holder consisting of a fixed plate 12 having an aperture 13 and a yieldable movable plate 14 having an aperture 15 alined with the aperture 13. The transparency holder of the existing projector is modified and adapted for the purpose of this invention by mounting the movable plate 14 on pins 16 which secure the U-shaped springs 17 to the fixed plate for yieldably urging the plate 14 toward the fixed plate. A transparency or transparent positive film picture 18 such as is currently available in a mounting border or frame 19 is yieldably and slidably adjustable between the plates 13 and 14 so as to locate the projected image of the subject picture on the transparent screen as desired.

Mounted rearwardly or to the right of the picture holder is a lense system consisting of a suitable support 20 having a tubular neck 21 within which the tubular lens holder 22 is slidably mounted for supporting a lens or lenses 23 at the desired distance from the transparency 18. The side of the support 20 pivotally supports a focusing lever 24 which is connected by a link 25 to the tubular lens holder 22 to longitudinally adjust the lens of the lens system and thus adjust the focus of the light rays projected through the transparency. Fixedly mounted within the case behind the lens system is an inclined mirror or reflector 26 supported on a suitable bracket 27 by the border frame 28. The reflector receives the projected light from the lens system and reflects the image in increasing size as indicated by the dotted lines at 29 in FIG. 2. No attempt has been made to illustrate the details or particular dimensions of the lens system, light source and reflector mounting as these are well known.

In order to adapt the view screen holding plate 2 and the screen 5 for the purpose of the invention the downturned flanges 30 on the sides of the plate 2 are provided with laterally projecting pins 31 which support the side strips 32 of a U-shaped overlay supporting plate on the plate 2. The pins 31 are connected to downturned flanges 33 on the sides of the overlay supporting plate and at the upper or right hand end of the view screen plate 2 the overlay supporting plate has its top cross member 33 secured in place by U-shaped clips 34 and bolts 35. Secured to the downturned flanges 33 are side plates 36 having upstanding ears 37 and 38. The ears support axles 39 of drums 40 on which a strip of overlay transparency or film 41 may be wound to present different portions of the film and different overlay images thereon over the view screen 5. Hold down rollers 42 supported from the ears 37 and 38 guide the transparency film in smooth parallel relation to the surface of the view screen 5. The axles 39 of the drums are provided with cranks 43 as appears in FIG. 1 for selectively rotating different overlay images such as the hair style 55 into registry with the transparent view screen. The drums 40 are removably retained between the ears 37 and 38 by nuts 45 on the ends of the axles so that the drums may be removed to substitute a transparency strip 41 with different hair styles thereon.

As appears most clearly from FIG. 5 the sides of the case 1 are provided with adjustable pivot screws 46 having finger pieces on their outer ends and passed through the rear ends of tapered levers 47 which project forwardly or to the left in front of the case 1. The levers support a subject image size adjusting crossbar 48 across the front of the case 1. Mounted just inside of the levers 47 on the pivot pins 46 are screen supporting bars 49 having slots 50 in their lower ends permitting adjustment of the bars upwardly to clear the studs 51 from notches 52 in the adjusting levers so that the supporting bars may be folded down along side of the levers when the apparatus is not in use. The bars 49 project upwardly and abut the underside of the side strips 32. Stop pins 53 prevent or limit downward tilting of the plate and the view screen 5 when the apparatus is in use.

Figure 6:
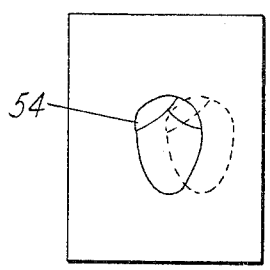
FIG. 6 is a view conventionally illustrating the projected image of the subject as may be viewed by the subject on the projection screen without any overlay image.
Figure 7:
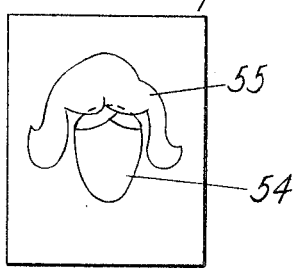
FIG. 7 is a conventional view showing the subject image of FIG. 6 with an overlaid image incorrectly registered and sized relative to the subject image.
Figure 8:
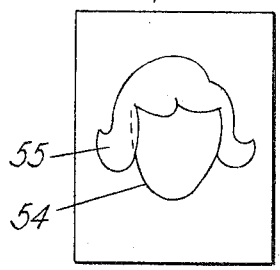
FIG. 8 is a view conventionally illustrating the projected image of the subject with the properly registered and sized overlay image as may be viewed by the subject for selecting between different overlay images.

The subject and overlay images are prepared and used in the following manner. As previously noted the transparent picture images 18 of the subject are presently available and can be taken and developed in currently available cameras in a few minutes. Prior to taking the picture, the hair of the subject is wrapped in a white cloth or turbin to produce an image as at 54 in FIG. 6 when the transparency is placed between the holder plates 13 and 14. The yieldable support of the plate 14 permits the subject image to be located as desired on the view screen 5. The overlay film 41 is then cranked from one drum to the other to bring an overlay image 55 of a hair style into view over the subject image 54 as in FIG. 7. The previously prepared overlay images 55 may not be the exact size or shape of the subject 54 so the size adjusting bar 48 can be pressed downwardly as indicated by the dotted ilnes at 48A to raise the view screen 5 and the overlay image 55 further away from the reflector 26 This enlarges the subject image 54 as in FIG. 8 and by manipulation of the subject picture transparency in the transparency holder and the focusing lever 24 a clear sharp image of the subject in the desired size and registry with the overlay image 55 can be quickly obtained. The subject can then view herself as she will appear with one or more of the overlay images and select the hair style which she desires. As previously noted the apparatus will be used primarily in beauty shops and ladies hair dressing shops where the operator will then arrange the subject's hair in the selected hair style The modified form of projecting and viewing apparatus shown in FIGS. 9 and 10 consist of a case 1A which is slightly deeper than the case 1 and which contains an inner case 11A having the reflector 8, lamp 7, and lens 9 therein transmitting light through the aperture 10. The transparency holder 13, 14, and the picture focusing lens system 20 can be the same as that described in the first form of the invention and the same reference numerals are applied thereto.

The reflector 26A is supported in a border frame 28A carried by a bracket 29A which is provided with outturned flanges 55 on its side edges. The flanges are slidably guided in guide rails 56 and a fixed rack 57 is secured to the bottom of the case 1A below the reflector. A shaft 58 journaled in the sides of the bracket 29A carries a pinion 59 and projects through the sides of the case 1A and slots 60 therein with hand knobs 61 on the ends of the shaft so that the operator may move the reflector forward toward the lens system as indicated by the dotted lines at 26B or rearwardly away from the lens This adjusts the size of the image projected against the transparent view screen 5A.

The cover plate 2A of the case is hinged to the case at 3A as before but is provided with integral downturned side flanges 62 having depending ears 63 at the front and back. The viewing opening 4A in the cover plate has the transparent view screen 5A secured across its underside by the border frame 6A. The ears 63 support the axles 39A of drums 40A which carry the film strip or coil 41 of overlay pictures. Guide rolls 42A rotatably supported between the flanges 62 guide the overlay image strip in close lapped relation along the underside of the transparent view screen. Prop bars 49A are pivoted on the flanges 62 at 64 to engage notches 65 in support rails 66 carried on the sides of the case 1A. When the apparatus is not in use, the props are lifted out of the notches and the cover plate 2A may be folded down with the prop bars resting in the dotted position shown at 49B.

The modified form of the apparatus in FIGS. 9 and 10 function in the same manner as the first form of the invention except that the size of the projected object image is adjusted by moving the reflector rather than by moving the transparent view screen.

The overlay transparencies can be prepared by photographing actual hair styles on one or more models and obtaining positive prints of the photographs. The face of the model and any background around the hair style is painted out with white paint and the remaining hair styles are rephotographed against a white background. The negative of these rephotographed hair styles are then printed successively and directly on transparent film strip to provide a series of different transparent overlay positives. It will be appreciated that multiple strips of the overlay positives can be reproduced quite easily in a central office or distribution to owners of the viewing apparatus. Periodically new strips of hair style positives may be furnished as a service to the owners of the viewing apparatus. As previously noted the overlay pictures need not be limited to hair styles but may be of different subject capable of being viewed over other subjects. The overlay pictures are not limited to subjects of different shape and may be pictures of identical shape and different color where it is desired to preview how the subject pictured will appear in different colors The several different overlay pictures 55 are desirably arranged in the same size or scale and positions on the strip 41 so that once a subject picture image 54 is registered and sized relative to one overlay on the strip, all other overlays are immediately registerable merely by advancing the overlay strip.

What is claimed as new is:
1. A picture projecting and overlay viewing apparatus comprising
   a case having a directed light source therein,
   a picture holder arranged to adjustably and frictionally hold a transparent positive picture of a subject mounted in a frame in the beam of light from said source,
   a lens system adjustably positioned to receive light through said picture and focus the same relative to a viewing screen,
   a reflector positioned to receive light from said lens system and reflect the light in an enlargement of the subject picture onto said screen,
   a transparent viewing screen adjustably mounted on said case and movable to a position to receive the picture transmitted by said lens system from said reflector, an overlay holding means including a pair of storage rolls and guide rolls carried with said screen and arranged to hold a transparent positive overlay picture against said screen and in the path of light from said source, and adjustable means for adjusting the size of the subject picture projected onto said screen whereby the subject picture and overlay picture may be viewed simultaneously on said screen in coordinated size and in overlaying registry.

2. A picture projecting and overlay viewing apparatus comprising a case having a directed light source supportedly mounted and housed therein, a picture holder arranged to hold a transparent positive picture of a subject in the beam of light from said light source, a lens system positioned to receive light through said picture and focus the same relative to a viewing screen, a reflector positioned to receive light from said lens system and reflect the light in an enlargement of the subject picture onto said screen, a viewing screen adjustably mounted on said case and movable to a position to receive the picture transmitted by said lens system from said reflector, an overlay holding means carried with said screen and arranged to hold a transparent positive overlay picture against said screen and in the path of light from said source, and adjustable means for adjusting the size of the subject picture projected onto said screen whereby the subject picture and overlay picture may be viewed simultaneously on said screen in coordinated size and in overlaying registry.

3. A picture projecting and overlay viewing apparatus comprising a case having a directed light source supportedly mounted and housed therein, a picture holder arranged to hold a transparent positive picture of a subject in the beam of light from said light source, a lens system positioned to receive light through said picture and focus the same relative to a viewing screen, a reflector positioned to receive light from said lens system and reflect the light in an enlargement of the subject picture onto said screen, a transparent viewing screen mounted on said case in a position to receive the picture transmitted by said lens system from said reflector, an overlay holding means carried with said screen and arranged to hold a transparent positive overlay picture against said screen and in the path of light from said source, and adjustable means for adjusting the size of the subject picture projected onto said screen whereby the subject picture and overlay picture may be viewed simultaneously on said screen in coordinated size and in overlaying registry.

4. Apparatus according to claim 3 in which said adjustable means consists of a handle pivotally mounted on said case and extending therealong, a hinged connection between said screen and said case spaced from said pivot, and a support adjustably slideably connected at a fixed angle to said handle and slideably engageable with said screen to tilt the screen in a zone spaced from said hinged connection toward and away from said reflector in response to pivotal movement of said handle.

5. Apparatus according to claim 3 in which said reflector is located within said case and said adjustable means consists of a movable support for said reflector, guide means securing said support to said case for linear reciprocation along the axis of the lens system, and means actuable for moving said reflector and said support toward and away from said lens system along said guide means.

6. Apparatus according to claim 3 in which said overlay holding means consists of a plate mounted along the sides and an end of said screen and projecting therefrom, ears on said plate supporting drums for carrying and reeling a strip of transparent film as part of the support for said overlay picture, and guide rolls carried by said plate guiding said strip along the upper surface of said screen, and said adjustable means consists of a hinged connection between said screen and said case, a handle pivotally mounted on said case, and support bars swingably connected to said handle and interlockingly engageable therewith in an erected position to engage said plate and tilt said screen toward and away from said reflector.

7. Apparatus according to claim 3 in which said overlay holding means consists of a plate hingedly connected to said case and supporting said screen, a disengageable support between said case and said plate adapted to support said screen in inclined position from the opposite end of said case from said reflector, flanges extending downwardly from the sides of said plate, drums supported between the ends of said flanges and adapted to swing into said case when said support is disengaged and to support and reel a strip of transparent material, and guide rollers guiding said strip between said other drums along the under surface of said screen.

8. Apparatus according to claim 7 in which said adjustable means consists of a movable support for said reflector, and means for moving said support toward and away from said lens system.

9. A picture projecting and overlay viewing apparatus comprising a case having a directed light source therein, a picture holder arranged to adjustably and frictionally hold a transparent positive picture of a subject in the beam of light from said source, a lens system adjustably positioned to receive light through said picture and focus the same relative to a viewing screen, a reflector positioned to receive light from said lens system and reflect the light in an enlargement of the subject picture onto said screen, a transparent viewing screen mounted on said case in a position to receive the picture transmitted by said lens system from said reflector, an overlay holding means including a pair of storage drums and guide rolls mounted at opposite ends of said screen and arranged to hold a transparent positive overlay picture against said screen and in the path of light from said source, and adjustable means for adjusting the size of the subject picture projected onto said screen whereby the subject picture and overlay picture may be viewed simultaneously on said screen in coordinated size and in overlaying registry.

10. A picture projecting and overlay viewing apparatus comprising a case having a directed light source element therein, a picture holder element arranged to adjustably hold a transparent positive picture of a subject in the beam of light from said source element, a lens system element adjustably positioned to receive light through said picture and focus the same relative to a viewing screen, a reflector positioned to receive light from said lens system and reflect the light in an enlargement of the subject picture onto said screen, a transparent viewing screen element mounted on said case in a position to receive the picture transmitted by said lens system element from said reflector, an overlay holding means including a pair of storage drums and guide rolls mounted at opposite ends of said screen and arranged to hold a transparent positive overlay picture against said screen and in the path of light from said source, and adjustable means for adjusting the size of the subject picture projected onto said screen whereby the subject picture and overlay picture may be viewed simultaneously on said screen in coordinated size and in overlaying registry.

11. A picture projecting and overlay viewing apparatus comprising a portable case having an illuminating means supportedly mounted therein, a picture holder element arranged to adjustably hold a transparent positive picture of a subject in the beam of light from said source element, a lens system element adjustably positioned to receive light through said picture and focus the same relative to a viewing screen, a transparent viewing screen element mounted on said case in a position to receive the picture transmitted by said lens system element, an overlay holding means arranged to hold a transparent positive overlay picture against said screen and in the path of light from said source, and adjustable means for adjusting the size of the subject picture projected onto said screen whereby the subject picture and overlay picture may be viewed simultaneously on said screen in coordinated size and in overlaying registry.

12. Apparatus according to claim 10 in which said adjustable means consists of a movable support for one of said elements, and means for moving said one element on its support along the optical line of projection of light from said source.

13. A picture projecting and overlay viewing apparatus comprising, a portable case having an illuminating means supportedly mounted therein, a picture holder arranged to adjustably and frictionally hold a transparent positive picture of a subject in the beam of light from said source, a leans system adjustably positioned to receive light through said picture and focus the same relative to a viewing screen, a reflector positioned to receive light from said lens system and reflect the light in an enlargement of the subject picture onto said screen, a viewing screen adapted to be mounted in a position to receive the picture transmitted by said lens system from said reflector, and an overlay holding means arranged to hold a transparent positive overlay picture against said screen and in the path of light from said source, guide means mounting said reflector on the case for linear reciprocation along the axis of said lens system, cover means pivotally carried by said case supporting said screen and further means pivotally mounted on one of said case and cover means and slideably engageable with the other of said case and cover means for varying the angle of said screen with respect to said reflector, the size of the subject picture projected onto said screen being adjustable by moving said screen and said lens system and reflector relative to each other whereby the subject picture and overlay picture may be viewed simultaneously on said screen in coordinated size and in overlaying registry.

14. A picture projecting and overlay viewing apparatus comprising, a portable case having an illuminating means supportedly mounted therein, a picture holder arranged to hold a transparent positive picture of a subject in the beam of light from said source, a lens system adjustably positioned to receive light through said picture and focus the same relative to a viewing screen, a viewing screen adapted to be mounted in a position to receive the picture transmitted by said lens system, and an overlay holding means arranged to hold a transparent positive overlay picture against said screen and in the path of light from said source, the size of the subject picture projected onto said screen being adjustable by moving said screen and said lens system relative to each other whereby the subject picture and overlay picture may be viewed simultaneously on said screen in coordinated size and in overlaying registry.

References Cited by the Examiner

UNITED STATES PATENTS

| | | | |
|---|---|---|---|
| 2,061,378 | 11/1936 | Henze et al. | 88—24 |
| 2,499,351 | 3/1950 | Bretz | 88—24 |
| 2,634,652 | 4/1953 | Barth | 88—24 |
| 2,859,660 | 11/1958 | Lucas | 88—24 |
| 3,002,434 | 10/1961 | Reuter | 88—24 |
| 3,059,529 | 11/1962 | Lucas | 88—24 |
| 3,124,035 | 3/1964 | Lucas | 88—26 X |

NORTON ANSHER, *Primary Examiner.*

H. H. FLANDERS, *Assistant Examiner.*